(12) United States Patent
Lee et al.

(10) Patent No.: US 7,599,322 B2
(45) Date of Patent: Oct. 6, 2009

(54) METHOD FOR MEASURING RECEIVE SENSITIVITY OF BASE STATION HAVING MULTIPLE FREQUENCY ALLOCATIONS

(75) Inventors: Sang Keun Lee, Seongnam (KR); Sang Kyun Kim, Seoul (KR)

(73) Assignees: MTI Co., Ltd. (KR); KT Corporation (KR)

( * ) Notice: Subject to any disclaimer, the term of this patent is extended or adjusted under 35 U.S.C. 154(b) by 856 days.

(21) Appl. No.: 10/382,550

(22) Filed: Mar. 6, 2003

(65) Prior Publication Data

US 2003/0179730 A1 Sep. 25, 2003

(30) Foreign Application Priority Data

Mar. 25, 2002 (KR) .................. 10-2002-0016198

(51) Int. Cl.
*H04W 4/00* (2009.01)
(52) U.S. Cl. ............... 370/327; 370/252; 370/331; 455/423; 455/67.11; 455/69
(58) Field of Classification Search ......... 455/423–425, 455/67.11–67.14, 450, 561, 424, 446–447; 370/329, 350; 375/356
See application file for complete search history.

(56) References Cited

U.S. PATENT DOCUMENTS

| | | | | |
|---|---|---|---|---|
| 5,095,500 A * | 3/1992 | Tayloe et al. | ............ | 379/32.1 |
| 5,128,959 A * | 7/1992 | Bruckert | ............ | 370/335 |
| 5,570,373 A * | 10/1996 | Wing | ............ | 455/423 |
| 5,687,171 A * | 11/1997 | Shin et al. | ............ | 370/335 |
| 5,768,688 A * | 6/1998 | Owada | ............ | 455/67.11 |
| 5,930,707 A * | 7/1999 | Vambaris et al. | ............ | 455/424 |
| 5,933,776 A * | 8/1999 | Kirkpatrick | ............ | 455/423 |
| 6,285,876 B1 * | 9/2001 | Zhong | ............ | 455/424 |
| 6,430,420 B1 * | 8/2002 | Johnson et al. | ............ | 455/561 |
| 6,434,364 B1 * | 8/2002 | O'Riordain | ............ | 455/67.11 |
| 6,466,560 B1 * | 10/2002 | Lee et al. | ............ | 370/335 |
| 6,662,008 B1 * | 12/2003 | Dolan et al. | ............ | 455/423 |
| 6,744,754 B1 * | 6/2004 | Lee | ............ | 370/342 |
| 6,839,560 B1 * | 1/2005 | Bahl et al. | ............ | 455/456.1 |
| 6,856,802 B1 * | 2/2005 | Kinnunen et al. | ............ | 455/425 |
| 6,885,640 B2 * | 4/2005 | Pinola | ............ | 370/241 |
| 6,965,587 B2 * | 11/2005 | Cho et al. | ............ | 370/335 |
| 7,003,290 B1 * | 2/2006 | Salonaho et al. | ............ | 455/423 |
| 7,010,295 B1 * | 3/2006 | Zerlan et al. | ............ | 455/424 |
| 7,047,017 B2 * | 5/2006 | Declerck et al. | ............ | 455/452.1 |

(Continued)

FOREIGN PATENT DOCUMENTS

KR 000073674 12/2000

*Primary Examiner*—Sharad Rampuria
(74) *Attorney, Agent, or Firm*—Keusey, Tutunjian & Bitetto, P.C.

(57) ABSTRACT

Disclosed is a method for measuring receive sensitivity of a base station in order to test a plurality of FAs with only one test terminal. The method includes the steps of: performing synchronization of a primary FA and detecting a channel list at the test terminal; and sensing at least one FA from the base station according to the channel list at a controller, and controlling the test terminal to perform synchronization of each FA from a first FA of a first sector to the last FA of the last sector, one by one. Therefore, it has an advantage in that the receive sensitivity of all FAs (frequency allocations) can be measured by using only one test terminal, while testing receive sensitivity of a base station providing multiple FAs.

7 Claims, 4 Drawing Sheets

U.S. PATENT DOCUMENTS

| | | | |
|---|---|---|---|
| 7,127,212 B2 * | 10/2006 | Fattouch | 455/63.1 |
| 7,151,927 B1 * | 12/2006 | Weaver, Jr. | 455/423 |
| 7,158,812 B2 * | 1/2007 | Lee et al. | 455/561 |
| 7,327,984 B2 * | 2/2008 | Oh et al. | 455/67.11 |
| 7,466,682 B1 * | 12/2008 | Ribas et al. | 370/342 |
| 2001/0008832 A1 * | 7/2001 | Kaindl | 455/67.4 |
| 2002/0183054 A1 * | 12/2002 | Rimoni et al. | 455/423 |
| 2005/0130595 A1 * | 6/2005 | Shurvinton et al. | 455/67.11 |

* cited by examiner ated into the original data. In this CDMA system, there may be caused a near-far problem in which communication of a transmitting station is disturbed by a signal from another transmitting station (which functions as an interference station) in a case where the interference station is located much nearer than the transmitting station from the targeted station (base station). Consequently, the more distant desired mobile station has difficulty in performing communication due to such interference. In order to solve the near-far problem, it is necessary to precisely control the transmission power in such a manner that the less distant mobile station uses a lower transmission power while the more distant mobile station uses a higher transmission power in transmitting a signal.

METHOD FOR MEASURING RECEIVE SENSITIVITY OF BASE STATION HAVING MULTIPLE FREQUENCY ALLOCATIONS

BACKGROUND OF THE INVENTION

1. Field of the Invention

The present invention relates to a method for measuring receive sensitivity of a base station having multiple frequency allocations (FAs), and more particularly to a method for measuring receive sensitivity of a base station in order to test a plurality of FAs with only one test terminal.

2. Description of the Prior Art

In general, CDMA (code division multiple access) refers to a kind of multiple access method, which allows a plurality of users to communicate at the same time and/or frequency in a wireless communication system employed in car phones, cellular (or portable) phones and so forth.

The CDMA system is a spread spectrum communication system, in which information signals are transmitted in a state, in which, the information signals are subjected to spreading at a wider bandwidth than that of the original information signals. Further, when original data are transmitted, they are subjected to spreading by means of PN (pseudo random noise) codes called spreading codes. Then, when the spread data are received, they are subjected to de-spreading by means of the same PN codes as the PN codes which are used to transmit the data, so that the received data are regenerated into the original data. In this CDMA system, there may be caused a near-far problem in which communication of a transmitting station is disturbed by a signal from another transmitting station (which functions as an interference station) in a case where the interference station is located much nearer than the transmitting station from the targeted station (base station). Consequently, the more distant desired mobile station has difficulty in performing communication due to such interference. In order to solve the near-far problem, it is necessary to precisely control the transmission power in such a manner that the less distant mobile station uses a lower transmission power while the more distant mobile station uses a higher transmission power in transmitting a signal.

FIG. 1 is a view illustrating a general communication between a CDMA base station and a mobile station, wherein the transmission route from the base station 10 to the mobile station 20 is a forward link (downlink) and the transmission route from the mobile station 20 to the base station 10 is a reverse link (uplink).

The power control of the reverse link in the CDMA system has been regarded as a very important factor because the power directly affects the acceptable number of subscriber and available communication distance. In a conversation phase, the base station 10 checks the sensitivity of the signals received from the mobile station (that is, a terminal) 20, and transmits a power control signal which causes the mobile station 20 to control the transmission power so that the base station 10 can receive the lowest power necessary for keeping a preset sensitivity for receiving signals. By the power control function, the input end of the base station 10 can receive the lowest power needed for demodulating the received signals, wherein the value of the lowest power is a receive sensitivity of the base station 10.

Meanwhile, the base station 10 may increase the capacity for subscribers by separating a service cell into several sectors with omni-directional antennas or multidirectional sector antennas.

FIG. 2 is a view illustrating an example of separating a service cell into three sectors, wherein the base station in the service cell provides communication service to each of the three sectors separated by three antennas 15-1 to 15-3. Then, the base station accommodates at least one FA (frequency allocation) per sector and provides transmitting/receiving functions to each sector independently.

In the CDMA base station, the transmission characteristic can be easily analyzed by using a conventional measuring instrument, while the analysis of the receiving characteristic must follow a very complicated process.

FIG. 3 is a schematic view illustrating an example of a conventional test construction for measuring the receive sensitivity of the CDMA base station.

Generally, a CDMA base station, not herein illustrated, comprises a control section, a network matching section, a time/frequency device, a digital signal process device and a RF signal device. The control section operates and manages the whole base station. The network matching section performs a packet routing function between the base station and a BSC (Base Station Controller) through E1 carrier system or T1 carrier system, and interfaces packet data among processors in the base station. The time/frequency device generates a reference frequency and a timing synchronization signal in order to synchronize processors in the base station and to perform a timing synchronization with neighbor base stations. The digital signal process device modulates/demodulates data and voice signals transmitted/received through the CDMA channel. The RF signal device converts high frequency radio signals received from a mobile station to IF (intermediate frequency) signals, and converts IF signals to high frequency radio signals.

In such a base station, a test system for the receive sensitivity, as shown in FIG. 3, includes a test terminal (mobile terminal) 31 connected to the high frequency radio end part of a base station 10 through a directional coupler 36 and cables, wherein the base station 10 comprises a high power amplifier (HPA) 11, a duplexer 12, a low noise amplifier (LNA) 13 and an antenna. Then, the test terminal 31, set in an electromagnetic wave blocking case, stores an original number for a subscriber, radio signals outputted from the test terminal 31 are transmitted to the directional coupler 36 through a coupler 32, a fist attenuator 33 and cables. Also, radio signals outputted from the test terminal 31 branch off through the coupler 32 and are transmitted to a spectrum analyzer 35 through a second attenuator 34 and cables. Thus, it is possible to analyze the receiving characteristic of the input end of the base station 10 by analyzing the signal level inputted into the spectrum analyzer 35. Specifically, two attenuation levels, which include one attenuation level from the test terminal 31 to the input end of the base station 10 through the first attenuator 33 and the directional coupler 36 and, the other attenuation level from the test terminal 31 to spectrum analyzer 35 through the second attenuator 34, can be measured. Therefore, the value of the signal level received in the input end of the base station 10 through the directional coupler 36 can be indirectly calculated by measuring the level of the test terminal 31 by using the spectrum analyzer 35. Conventionally, the receiving characteristic is measured after setting the attenuation value of the attenuator so as to adjust the level of the input end of the base station 10 to about −116 dBm.

A mobile station, belonging to a base station which has multi-FA (frequency allocation), determines its own FA frequency and performs synchronization according to the Hash Function by using its mobile identification number (MIN) with reference to CDMA standards. Thus, all mobile stations belonging to a base station having multi-FA always perform synchronization only to a special FA frequency channel by their mobile identification numbers (MINs).

Therefore, in order to measure the receive sensitivity of the base station having multi-FA, a plurality of terminals having different mobile identification numbers (MINs) from one another corresponding to the number of the FA are needed. Also, another problem includes that when the frequency channel is increased a complicated process must be followed, that is, the base station 10 must again allocate mobile identification numbers (MINs) in order to uniformly insure the frequency of the preset MINs for mobile stations already being operated as well as the frequency of the MINs for mobile stations being added.

SUMMARY OF THE INVENTION

Accordingly, the present invention has been made to solve the above-mentioned problems occurring in the prior art, and one object of the present invention is to provide a method for measuring receive sensitivity in a base station having multi-FA (frequency allocation) in order to test receive sensitivity for all FA of a base station having multi-FA by using one test terminal.

In order to accomplish this object and other objects, in accordance with the first aspect of the present invention, there is provided a method for measuring receive sensitivity of a base station having multiple frequency allocation by measuring output of a test terminal, wherein the test terminal is set in an electromagnetic wave blocking case, the output of the test terminal being connected by cables to an RF coupler of the base station through an attenuator, the method comprising the steps of: storing mobile identification numbers (MINs) corresponding to frequency allocations (FAs) of the base station in the test terminal; and testing each FA of the base station by setting up an originating-calls to each MIN stored in the test terminal.

In accordance with the second aspect of the present invention, there is provided a method for measuring receive sensitivity of a base station having multiple frequency allocation by measuring output of a test terminal, wherein the test terminal is set in an electromagnetic wave blocking case, the output of the test terminal being connected to an RF coupler of the base station through an attenuator by cables, the method comprising the steps of: performing synchronization of a primary FA and detecting a channel list at the test terminal; and sensing at least one FA from the base station according to the channel list at a controller, and controlling the test terminal to perform synchronization of each FA from a first FA of a first sector to the last FA of the last sector, one by one.

BRIEF DESCRIPTION OF THE DRAWINGS

The above and other objects, features and advantages of the present invention will be more apparent from the following detailed description taken in conjunction with the accompanying drawings, in which.

DESCRIPTION OF THE PREFERRED EMBODIMENTS

Figure 1:
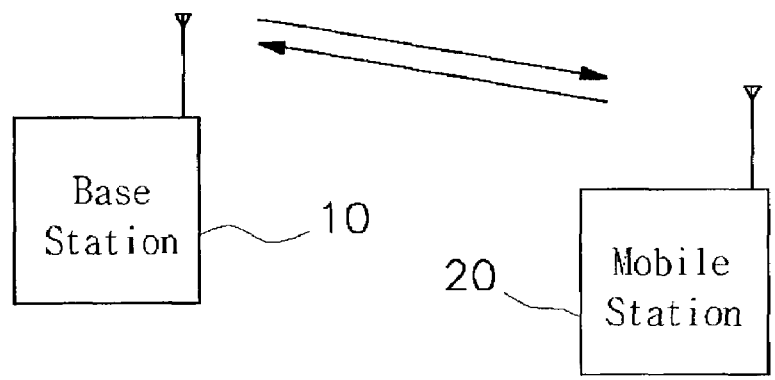
FIG. 1 is a view illustrating a general communication between a CDMA base station and a mobile station.
Figure 2:
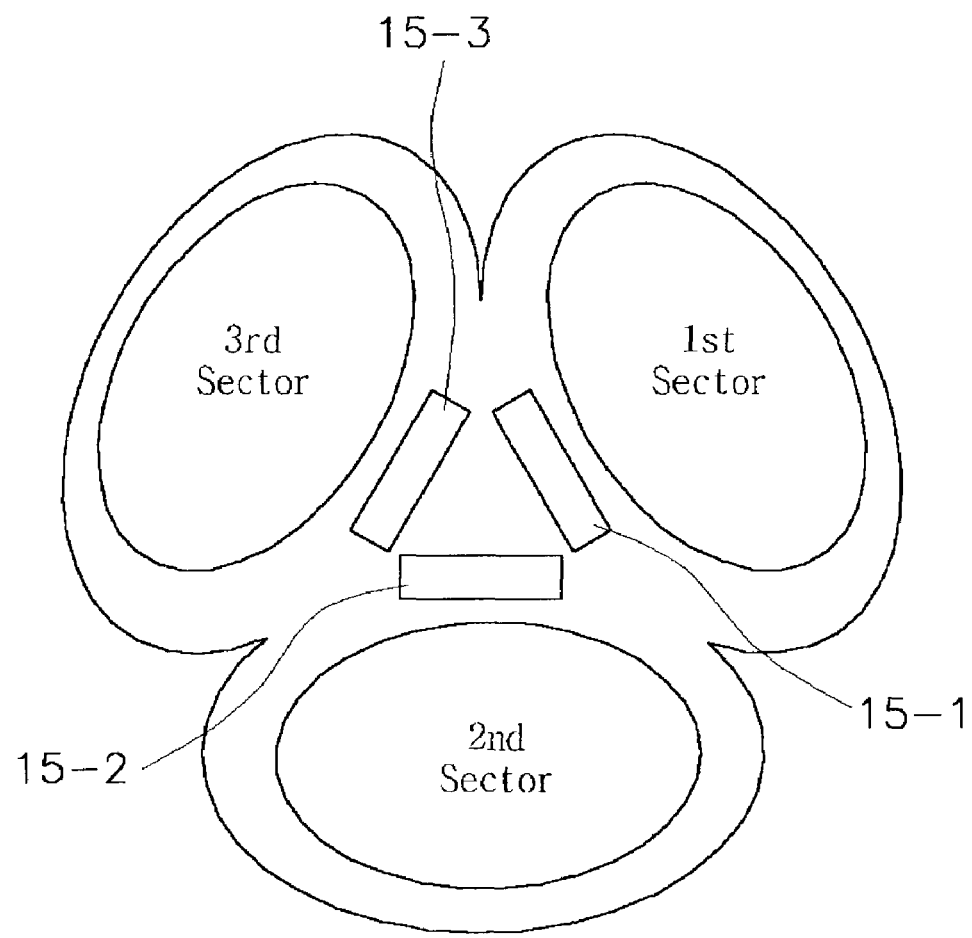
FIG. 2 is a view illustrating an example of separating a service cell into three sectors.
Figure 3:
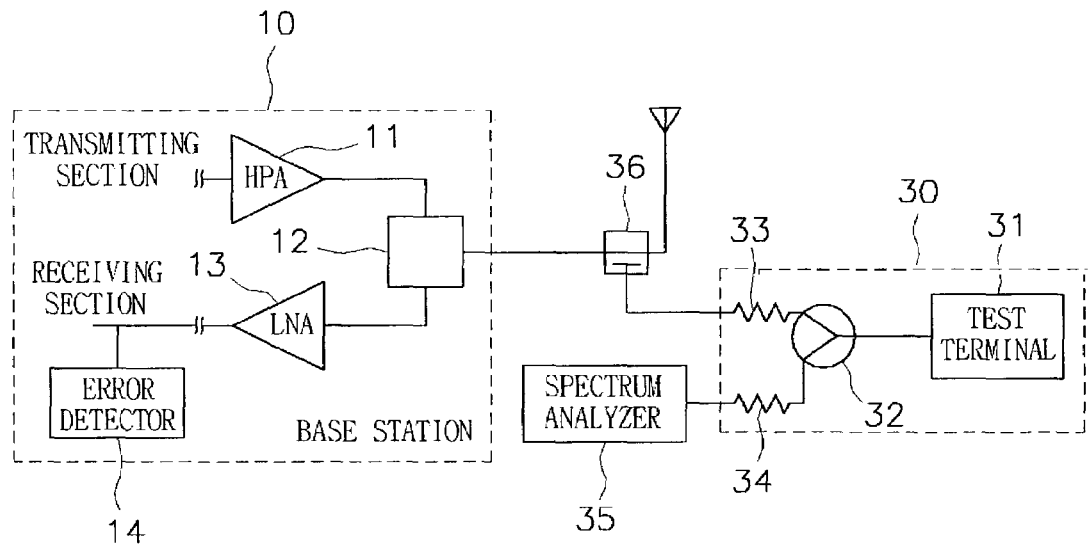
FIG. 3 is a schematic view illustrating an example of a conventional test construction for measuring the receive sensitivity of the CDMA base station.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 4:
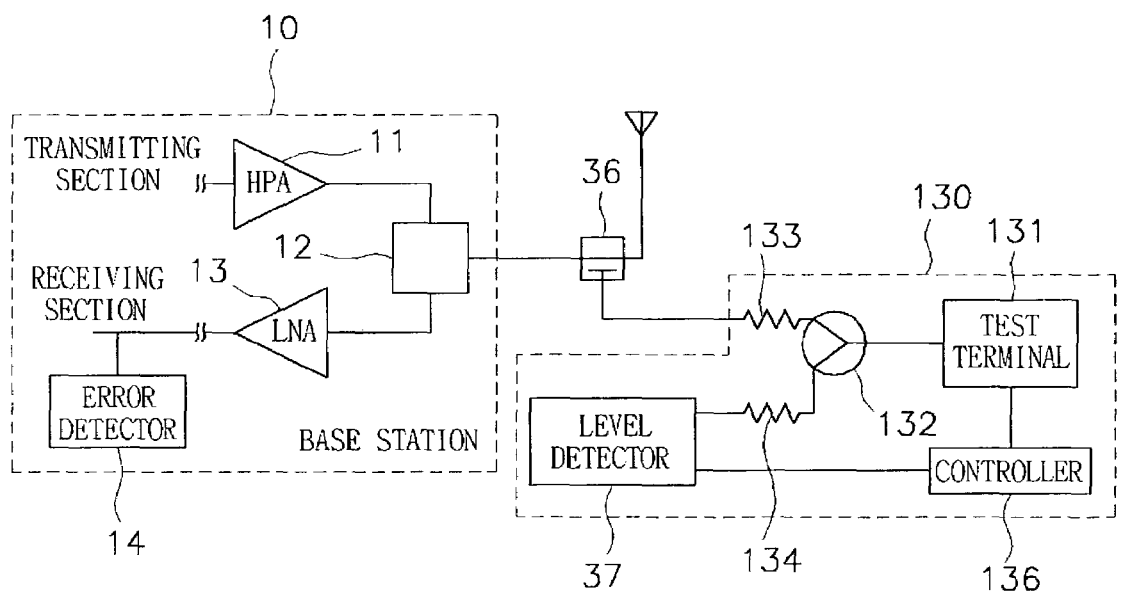
FIG. 4 is a schematic view illustrating a construction for measuring receive sensitivity of a base station according to an embodiment of the present invention.

FIG. 4 is a schematic view illustrating a construction for measuring receive sensitivity of a base station according to an embodiment of the present invention.

First, in order to solve the problem that a plurality of mobile stations having different mobile identification numbers (MINs) from one another are required, a first method of the present invention is to store a plurality of MINs in one test terminal and to change the MINs of the test terminal one by one during a test of receive sensitivity in a base station having multi-FA (frequency allocation). The first method of the present invention has an advantage in that only one test terminal is required for testing the receive sensitivity, but it has a problem in that a plurality of MINs are occupied.

A second method of the present invention is a method of forcibly synchronizing the test terminal with each FA one by one, while disregarding the value of a frequency channel being determined by the Hash Function which uses MINs according to the CDMA standard. In this case, it is possible to use a standard process without a problem of call set-up because all types of calls of the test terminal are originating-calls from mobile stations, and also the test system may have no process for verifying whether or not the synchronization is performed with the FA of the test system at the time of setting the originating-call of the test terminal. In the second method according to the present invention, a duplex mode base station, which supports a second generation wireless system (2G) and a CDMA 1X system (1X), can be forcedly controlled to synchronize with FAs of the 2G and the 1X, so that a test for all FAs of both the 2G and 1X can be carried out by means of a single test terminal.

Referring to FIG. 4, a test system for the receive characteristic includes a test terminal (mobile terminal) 131 connected to the high frequency radio end part of a base station 10 through a first attenuator 133, directional coupler 36 and cables, wherein the base station 10 comprises a high power amplifier (HPA) 11, a duplexer 12, a low noise amplifier (LNA) 13 and an antenna. Then, the test terminal 131, set in an electromagnetic wave blocking case, stores a plurality of mobile identification numbers (MINs) or can forcibly set the MINs according to the present invention. Also, the test terminal 131 changes the MIN or performs forcible synchronization of a frequency signal of a special FA by the control of the controller 136 according to the present invention. The reference number 134 in FIG. 4 is a second attenuator.

The radio signals of the test terminal 131 are transmitted to the directional coupler 36 through a coupler 132, the first attenuator 133 and the cables, and they branch off through the coupler 132 and are transmitted to a level detector (a power analyzer) 37, thus it is possible to analyze the receive characteristic of the input end of the base station 10. That is, two attenuation levels can be measured, one attenuation level being made from the test terminal 131 to the input end of the base station 10 through the first attenuator 133 and the directional coupler 36, the other attenuation level being made from the test terminal 131 to a level detector 37, so that the value of the signal level received in the input end of the base station 10 through the directional coupler 36 can be indirectly calculated by measuring the level of the test terminal 131 with the level detector 37. Conventionally, the receive characteristic is measured after setting the attenuation value of the attenuator so as to adjust the level of the input end of the base station 10 to about −116 dBm.

The test system according to the present invention has a difference in that the controller 136 for controlling the test terminal 131 is added to the construction of a conventional test system. That is, in the case of the first embodiment of the present invention, the test terminal 131 stores a plurality of Mobile Identification Numbers (MINs) and originates a call to a pertinent MIN corresponding to an FA which the controller 136 wants to test.

Also, in case of the second method of the present invention, the controller 136 generates a control signal for FA frequency synchronization in order to forcibly perform the test by controlling originating-calls from the test terminal 131.

Therefore, when the test terminal 13 generates frequency signals of FA band desired to be tested by controlling the controller 136, the signals are attenuated through the first attenuator 133 and are inputted to the directional coupler 36 connected to the base station 10 through cables. The base station 10 receives the signals inputted into the directional coupler 36 and detects any error with an error detector 14. Then, a control which adjusts the transmission output power of the test terminal 131, so as to minimize the input power of the input end of the base station 10 within an allowed range, is performed. The input power received into the input end of the base station 10 is the receive sensitivity.

Figure 5:
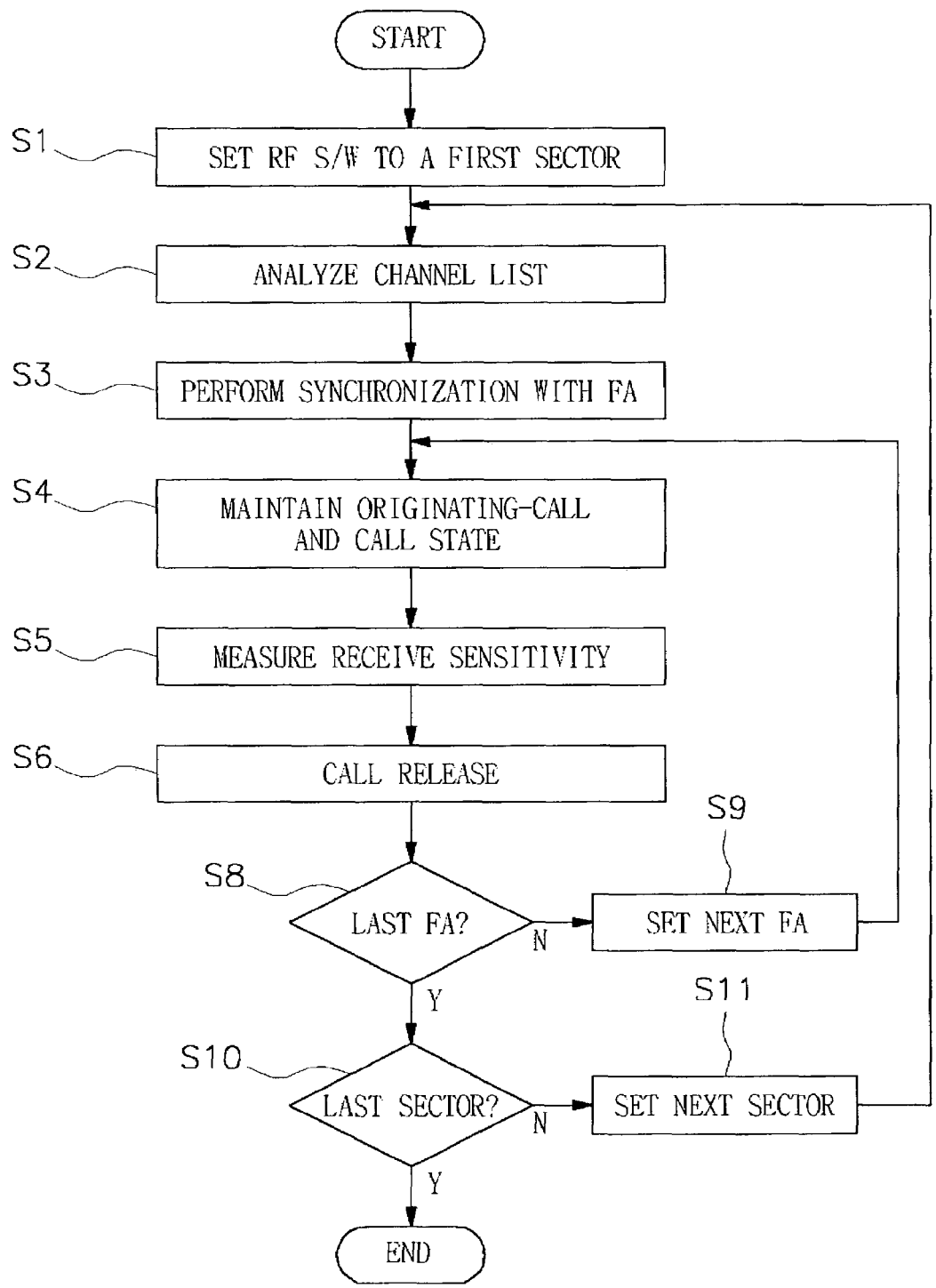
FIG. 5 is a flowchart illustrating a process for measuring a receive sensitivity of the base station according to an embodiment of the present invention.

FIG. 5 is a flowchart illustrating a process for measuring a receive sensitivity of the base station according to an embodiment of the present invention.

Referring to FIG. 5, the receive sensitivity measurement is begun with the construction described in FIG. 4.

First, the controller 136 sets an RF switch to a first sector of multiple sectors (step S1).

The test terminal 131 receives a channel list of the base station information included in paging channels which are transmitted from the base station 10 synchronized with a primary FA (frequency allocation), and transmits the received channel list to the controller 136 (step S2).

The controller 136 controls the test terminal 131 to perform synchronization with the primary FA (step S3) and the test terminal 131 to maintain the originating-call set-up and the call status (step S4). In such a call state, when the power control is performed by the base station 10, the receive sensitivity is measured (step S5).

When the measurement of the receive sensitivity has been completed, the controller 136 outputs a call release command to the test terminal 131 (step S6) and judges whether or not the test has been performed to the last FA of a pertinent sector (step S8). As a result of the judgment in step S8, when the test has not been performed to the last FA, the controller 136 assigns a next FA (step S9) and performs step S4 to step S8 again. As a result of the judgment in step S8, when the test has been performed to the last FA, the controller 136 judges whether or not the test has been performed to the last sector (step S1). As a result of the judgment in step S10, when the test has not been performed to the last sector, the controller 136 assigns a next sector (step S11) and performs step S2 to step S10 again. As a result of the judgment in step S10, when the test has been performed to the last sector, the controller 136 finishes testing.

According to the present invention described above, the controller 136 controls the test terminal 131 to forcibly perform synchronization to the FA (frequency allocation), so that it is possible to test all the FAs of all the sectors with one test terminal.

For example, the base station is a multiple FA base station supporting five FAs per sector and provides sectors separated to three directions, the test system according to the present invention performs a total of 15 tests from the test for a first FA of a first sector to the test for a fifth FA of a fifth sector. For such a test, a conventional system needs at least five test terminals, with a test terminal for each FA. Advantageously, the test system of the present invention performs all of tests with only one test terminal.

Meanwhile, the receive sensitivity of the base station varies with traffic quantity, so that the original receive sensitivity of the base station may be measured differently according to variation of the traffic quantity.

Figure 6:
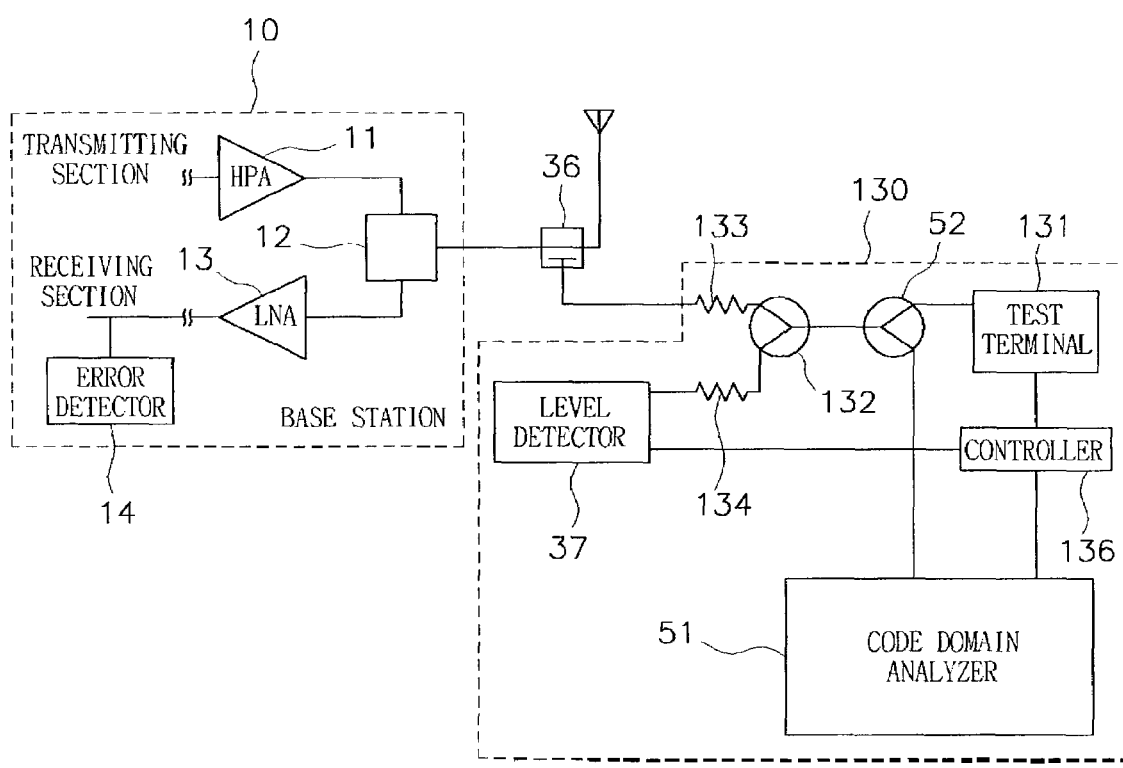
FIG. 6 is a schematic view illustrating a construction for measuring receive sensitivity of a base station according to another embodiment of the present invention.

FIG. 6 is a schematic view illustrating a construction for measuring receive sensitivity of a base station according to another embodiment of the present invention.

Referring to FIG. 6, a code domain analyzer 51 for CDMA is additionally connected to the controller 136 having the construction illustrated in FIG. 4, and the code domain analyzer 51 analyzes whether or not any traffic channels exist and how many traffic channels there are. Therefore, after it is confirmed that other traffic doesn't exist besides pertinent traffic of a test terminal used for measuring receive sensitivity, the test for measuring receive sensitivity can be begun. In this case, because the code domain analyzer 51 has to sense signals received by the base station, a coupler 52 is additionally connected, as shown in FIG. 6.

Meanwhile, a receive sensitivity is measured after analyzing continuously forward link Ec/Io of test terminal, so that it is possible to minimize a measurement drift of the receive sensitivity, which varies dynamically according to the number of traffic channels.

As described above, the present invention has at least one advantage in that the receive sensitivity of all FAs (frequency allocations) can be measured by using only one test terminal, while testing receive sensitivity of a base station having multiple FAs.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed:

1. A method, comprising the steps of:
    measuring receive sensitivity of a base station having multiple frequency allocation by measuring output of a mobile phone under test, wherein the mobile phone under test is set in an electromagnetic wave blocking case, the output of the mobile phone under test being connected to an RF coupler of the base station through an attenuator by cables, said measuring step including the steps of:
        selecting only a single mobile terminal as the mobile phone under test so as to reduce, at a commencement of the method, a number of mobile terminals capable of being involved in the method to only one;
        storing mobile identification numbers (MINs) corresponding to frequency allocations (FAs) of the base station in the mobile phone under test; and testing each FA of the base station by setting up originating-calls from the mobile phone under test to each MIN stored in the mobile phone under test, wherein a controller connected to the mobile phone under test changes a MIN of the mobile phone under test corresponding to a FA which the controller wants to test and originates a call to the changed MIN in order to test the FA of the base station which the controller wants to test.

2. The method as claimed in claim 1, further comprising a step of: analyzing continuously code range of a forward link and testing a receive sensitivity when no traffic channel is assigned, so as to minimize a measurement drift of the receive sensitivity, which varies dynamically according to traffic quantity.

3. The method as claimed in claim 1, wherein the step of storing includes storing at lest two MINs on the mobile phone under test.

4. The method as claimed in claim 3, wherein the step of testing includes originating calls to MIN corresponding to an FA in accordance with a designation by a controller.

5. A method, comprising the steps of:

measuring receive sensitivity of a base station having multiple frequency allocation by measuring output of a mobile phone under test, wherein the mobile phone under test is set in an electromagnetic wave blocking case, the output of the mobile phone under test being connected to an RF coupler of the base station through an attenuator by cables, said measuring step includes the steps of:

selecting only a single mobile terminal as the mobile phone under test so as to reduce, at a commencement of the method, a number of mobile terminals capable of being involved in the method to only one;

performing synchronization of a primary FA and detecting a channel list at the mobile phone under test; and sensing at least one FA from the base station according to the channel list at a controller, and controlling the mobile phone under test to perform synchronization of each FA from a first FA of a first sector to the last FA of the last sector, one by one by ignoring hash functions, wherein the controller connected to the mobile phone under test forcibly controls originating-calls from the mobile phone under test in order to generate a control signal for frequency synchronization of a FA which the controller wants to test and sets up the forcibly controlled originating-calls from the mobile phone under test in order to test the FA which the controller wants to test.

6. The method as claimed in claim 5, wherein the base station is a simplex or duplex mode base station which supports a second generation wireless system (2G) and a CDMA 1X system (1X), and the mobile phone under test generates all FA signals for the 2G and 1X one by one by ignoring hash functions, according to the control signal of the controller, so as to measure receive sensitivity of all of the FAs.

7. The method as claimed in claim 5, further comprising a step of: analyzing continuously a forward link Ec/Io test terminal and testing a receive sensitivity when traffic channels are assigned, so as to minimize a measurement drift of the receive sensitivity, which varies dynamically according to a number of traffic channels.

* * * * *